(12) United States Patent
Aviles-Galberth

(10) Patent No.: US 10,232,753 B2
(45) Date of Patent: Mar. 19, 2019

(54) TRAVEL COMFORT DEVICE PROVIDING HEAD AND ARM SUPPORT

(71) Applicant: Lorena Aviles-Galberth, Westlake Village, CA (US)

(72) Inventor: Lorena Aviles-Galberth, Westlake Village, CA (US)

( * ) Notice: Subject to any disclaimer, the term of this patent is extended or adjusted under 35 U.S.C. 154(b) by 2 days.

(21) Appl. No.: 15/426,293

(22) Filed: Feb. 7, 2017

(65) Prior Publication Data
US 2017/0253154 A1  Sep. 7, 2017

Related U.S. Application Data

(60) Provisional application No. 62/302,943, filed on Mar. 3, 2016.

(51) Int. Cl.
| A41D 3/08 | (2006.01) |
| B60N 2/75 | (2018.01) |
| B60N 2/882 | (2018.01) |

(52) U.S. Cl.
CPC ............ *B60N 2/787* (2018.02); *B60N 2/882* (2018.02)

(58) Field of Classification Search
CPC ..... B60N 2/882; A47C 7/383; B60R 21/2017; B60R 2021/0093; B64D 11/06; B64D 11/0642
See application file for complete search history.

(56) References Cited

U.S. PATENT DOCUMENTS

| 2,708,475 | A | * | 5/1955 | Krewson | ................ | A47C 7/425 |
| | | | | | | 297/230.13 |
| 4,097,086 | A | | 6/1978 | Hudson | | |
| 4,560,201 | A | | 12/1985 | Scott | | |
| 5,471,690 | A | | 12/1995 | McNeil | | |
| 5,503,456 | A | * | 4/1996 | Rossini | ................... | A47C 7/383 |
| | | | | | | 224/584 |
| 5,544,378 | A | * | 8/1996 | Chow | .................... | A47C 7/383 |
| | | | | | | 297/397 |
| 5,800,018 | A | | 9/1998 | Colombo et al. | | |
| 5,975,638 | A | * | 11/1999 | Schreiner | ............... | A47C 7/383 |
| | | | | | | 297/220 |
| 6,116,691 | A | * | 9/2000 | Reece | .................... | B60N 2/882 |
| | | | | | | 297/392 |
| 6,457,195 | B1 | | 10/2002 | Holste | | |
| 6,484,335 | B2 | * | 11/2002 | Gilbert | ................... | A47C 7/383 |
| | | | | | | 297/397 |
| 6,625,829 | B2 | | 9/2003 | Zell | | |

(Continued)

OTHER PUBLICATIONS

DH Gate; U Neck Pillows Spine Protector Pillow Travel Healthy Pillows ineckfit Cars Pillows Cushions Neck Pillow for Cars; Internet merchandise; 4 pages; Available at: http://www.dhgate.com/product/u-neck-pillows-spine-protector-pillow-travel/270652382.html.

(Continued)

*Primary Examiner* — Shin H Kim

(74) *Attorney, Agent, or Firm* — Hankin Patent Law, APC; Kevin Schraven; Anooj Patel

(57) ABSTRACT

A travel comfort device designed to be used when the traveler is at rest or asleep in a seated position in a transportation vehicle, such as an airplane, motor vehicle, train, and the like. The travel comfort device may comprise a seatback mounting component, an arm support component, and a head support component, which are releasably attached to each other and/or the seat.

20 Claims, 18 Drawing Sheets

(56) References Cited

U.S. PATENT DOCUMENTS

| | | | |
|---|---|---|---|
| 6,643,870 B2 | 11/2003 | Bertrand | |
| 6,782,572 B1 * | 8/2004 | Jones | A47C 7/383 |
| | | | 297/397 |
| 6,966,069 B2 | 11/2005 | Booth | |
| 6,973,691 B1 | 12/2005 | Cordova | |
| 7,055,908 B1 | 6/2006 | Williams | |
| 7,581,259 B2 | 9/2009 | Thompson | |
| 7,740,318 B2 * | 6/2010 | Funke, III | A47C 7/383 |
| | | | 297/393 |
| 7,909,406 B2 | 3/2011 | Samuelsen | |
| 7,997,646 B2 | 8/2011 | Resendez | |
| 8,225,442 B2 | 7/2012 | Davis | |
| 8,418,293 B2 | 4/2013 | Tansingco | |
| 8,584,285 B1 | 11/2013 | Sipherd | |
| 8,707,481 B1 | 4/2014 | Juarez | |
| 8,814,106 B2 | 8/2014 | Aguilera | |
| 9,101,223 B2 | 8/2015 | Walker | |
| 9,408,471 B2 | 8/2016 | Higa | |
| 9,751,438 B2 * | 9/2017 | Dunham | B60N 2/882 |
| 2003/0061659 A1 | 4/2003 | Dunlap et al. | |
| 2004/0026979 A1 | 2/2004 | Haddon | |
| 2004/0124685 A1 * | 7/2004 | Buch | B60N 3/00 |
| | | | 297/393 |
| 2005/0173962 A1 | 8/2005 | Stein et al. | |
| 2009/0133192 A1 | 5/2009 | Hassell et al. | |
| 2010/0139001 A1 | 6/2010 | Mangano | |
| 2013/0119716 A1 * | 5/2013 | Stronconi | A47C 20/02 |
| | | | 297/180.1 |
| 2015/0061340 A1 * | 3/2015 | Fleming | B60R 22/001 |
| | | | 297/391 |
| 2017/0232874 A1 * | 8/2017 | Blankenship | B60N 2/882 |
| | | | 297/392 |

OTHER PUBLICATIONS

Bed Bath and Beyond; Sholdit® Infinity Neckwrap in Black; Internet merchandise; 2 pages; Available at: http://www.bedbathandbeyond.com/store/product/sholdit-reg-infinity-neckwrap-in-black/1043020102?categoryId=12699A.

The Grommet; Trtl Neck Support Travel Pillow; Internet merchandise; 14 pages; Available at: https://www.thegrommet.com/trtl.

Vavesta; Replace Your Travel Pillow with Something Better; Internet merchandise; 7 pages; Jun. 16, 2015; Available at: http://www.amazon.com/vaVesta-Replace-Travel-Pillow-Something/dp/B00VS3B8V8.

* cited by examiner

TRAVEL COMFORT DEVICE PROVIDING HEAD AND ARM SUPPORT

CROSS REFERENCE TO RELATED APPLICATION

This application claims the benefit of U.S. Provisional Application No. 62/302,943 filed on Mar. 3, 2016, the contents of which are incorporated herein by this reference as though set forth in their entirety.

FIELD OF USE

The present disclosure generally relates to the field of travel comfort devices. More specifically, the present disclosure generally relates to a device for providing passengers with a comfortable traveling experience by, in part, securing a user's head and arms. The device is designed to be used when the traveler is at rest or asleep in a seated position in a transportation vehicle, such as an airplane, motor vehicle, train, and the like.

BACKGROUND

A disadvantage of traveling by airline, train, or motor vehicle is the inability to stabilize the head while sleeping in an upright or near upright position, which often results in a lack of sleep while traveling. Complaints about sleep deprivation due to discomfort are particularly common among persons who must travel long distances in a confined seating space, whether by airplane, motor vehicle, train, etc.

Body position and seat comfort in particular play vital roles in the overall traveling experience, since a passenger normally spends most of the duration of travel in a seat. The transportation industry, especially the common carrier airlines, are under tremendous economic pressure to increase revenue by adding more seats to their aircraft fleet to transport more passengers without increase in the overall size of the aircraft to accommodate these additional seats. The result has been less room between seats, which translates to a reduction in how far seats can be reclined without encroaching on the personal space of the persons sitting behind. In addition, the angle of recline is also limited by the viewing angle restrictions for multimedia entertainment systems which are now prominently located in the rear of most seat headrests for servicing the passenger sitting behind. In such a limited seat recline-angle, the force of gravity against the body, head, and arms is not as neutralized as it is when the body is in the fully-reclined sleeping position.

When a person is trying to sleep in a seated body position, the downward pull of gravity and other forces action on an individual's head must be opposed by some other force, such as a person's neck and shoulders and associated muscles. The neck and shoulders may not reliably maintain such a state of equilibrium of forces when a person is sleeping, which may cause a person's head to jolt when the body attempts to sleep. Furthermore, a simple headrest such as those often found on the back of seat, while helpful in providing support to the back of the head, usually do not alone effectively equalize all the vector forces acting on the head in the direction from the side of a head facing toward a shoulder.

Several sleeping aids have attempted to provide comfort when a person is in a seated body position by equalizing the forces acting on the head. A common device used by travelers is the generally U-shaped neck pillow. However, such U-shaped pillow is usually not designed for use in seats that already provide special support to the back of the head. The U-shaped pillow primarily ensures that the user's head is cushioned on the sides, but still allows the user's head to droop forward. These neck pillow cushions also fail to include a mechanism for providing a user with somewhere to put his or her arms, and user's arms dangle loosely due to the force of gravity. When a person is in a seated position, loose arms that do not have proper assistance for opposing the downward pull of gravity may lead to discomfort and make a sleeping state more difficult to achieve.

SUMMARY

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with the embodiments herein, the present disclosure includes a travel comfort device designed to be used when the traveler is at rest or asleep in a seated position in a transportation vehicle, such as an airplane, motor vehicle, train, and the like. The travel comfort device provides passengers with a comfortable traveling experience by, in part, securing and/or supporting a user's head and arms.

In accordance with the embodiments herein, the present disclosure includes a travel comfort device comprising a seatback mounting component, a head support component, and an arm support component. The seatback mounting component is configured to releasably engage or attach to a headrest and/or uppermost portion of the seatback of a seat of a transportation vehicle. As used herein, the term "headrest" will refer to the uppermost portion of the seatback of a seat to which the seatback mounting component is attached. The head support component is configured to releasably engage or attach to the seatback mounting component. The arm support component is configured to be releasably engaged or attached to the seatback mounting component.

In accordance with one embodiment of the present disclosure, the seatback mounting component comprises a head cushion member and an attachment mechanism configured to be releasably attached to the headrest of the seat to which the passenger has been assigned or will occupy during travel. In a preferred embodiment, the seatback mounting component is configured to releasably attach with a plurality of, and more preferably, a majority of, seatback configurations found in airplanes, motor vehicles, trains, and the like. In one embodiment, the seatback mounting component comprises a head cushion member and a fastening assembly attached thereto and configured to engage with a portion of the headrest to attach the travel comfort device to the headrest. In a more preferred embodiment, the fastening assembly comprises at least one hanger member for engaging with the headrest.

In another embodiment according to the present disclosure, the seatback mounting component comprises a head cushion member and a mounting cap attached thereto and configured to engage with and/or cover at least a portion of the headrest. In a preferred embodiment, the mounting cap comprises a flexible material that is stretchable to accommodate the different headrest configurations and dimensions.

In accordance with one embodiment of the present disclosure, the seatback mounting component is configured to releasably attach with the headrest such that the seatback mounting component does not interfere with any multimedia entertainment device or other features located on the back of the seat for the entertainment or benefit of the passenger in the seat behind. In a preferred embodiment, the seatback mounting component is configured to engage with the headrest so as to not overlap with or cover a substantial portion of any entertainment device or other feature located on the back of the set to which the travel comfort device is attached.

In accordance with one embodiment of the present disclosure, the head support component comprises a head/neck support member and at least one fastening member for releasably attaching the head/neck support member to the seatback mounting component. The head/neck support member is configured to engage with a portion of the user's head and neck to provide support to the user's head and neck while sleeping or resting in a vertical or near-vertical position. The head/neck support member provides support to the head and neck to prevent forward and lateral bending while the user is relaxed or asleep while in a seated position.

In a preferred embodiment, the head/neck support member has a middle section and two opposing end sections, wherein the middle and the end sections each have an inner region and an opposing outer regions. The inner regions of both the middle section and the side sections are configured to be in contact with a portion of the user's lower face and upper chin. In a preferred embodiment, the head/neck support member may be sized and shaped to match the approximate shape of the lower face and upper neck of the user. In a preferred embodiment, at least a portion of the head/neck support member comprises a cushion, foam, pillow, or other pliable material for the comfort of the user.

In accordance with one embodiment of the present disclosure, the head support component includes at least one fastening member for releasably attaching the head/neck support member to the seatback mounting component. In a preferred embodiment, the head/neck support member is releasably attached to the seatback mounting component by at least one fastening member extending therebetween. In a more preferred embodiment, a fastening member is attached to each opposing side section of the head/neck support member, and extends therefrom, and releasably attaches to the seatback mounting component. In a more preferred embodiment, the fastening member is a strap, band, or the like. In a more preferred embodiment, the fastening member has an adjustable length such that the fastening member may be adjusted by means known to those skilled in the art, such as by a buckle.

In accordance with one embodiment of the present disclosure, the arm support component includes a bib member and at least one fastening member for releasably attaching the arm support member to the seatback mounting component. The bib member includes an exterior surface surrounding and forming interior pouch portion, and two opposing ends. The interior pouch portion is configured to receive one or both of the user's arms. In a preferred embodiment, the exterior surface includes at least one pocket configured to store objects for the user thereof, such as a cellular telephone, earphones, and the like. In a preferred embodiment, the exterior surface includes an auxiliary arm support pocket configured to receive one or both arms of the user. The bib member comprises any suitable material known by those skilled in the art.

In a preferred embodiment, the arm support component is releasably attached to the seatback mounting component by at least one fastening member. In a more preferred embodiment, the arm support member is releasably attached to the seatback mounting component by a fastening member extending therebetween. In a more preferred embodiment, a fastening member is attached to each opposing end of the arm support member, and extends therefrom, and releasably attaches to the seatback mounting component. In a more preferred embodiment, the fastening member is a strap, band, or the like. In a more preferred embodiment, the fastening member has an adjustable length such that the fastening member may be adjusted by means known to those skilled in the art, such as by a buckle.

One embodiment may be a travel comfort device, comprising: a seatback mounting component comprising an attachment mechanism configured to releasably attach to a seatback of a seat to be occupied by a user; and a head support component comprising a head/neck support member and at least one head support component fastening member for releasably attaching the head/neck support member to the seatback mounting component, wherein the head/neck support member is configured to engage with at least a portion of the user's head or neck to provide support to the user's head or neck when the user is seated in the seat. The travel device may further comprise an arm support component comprising a bib member and at least one arm support component fastening member for releasably attaching the bib member to the seatback mounting component. The bib member may comprise an exterior surface surrounding and forming an interior pouch portion, wherein the interior pouch portion may be configured to receive at least one of the user's arms. The seatback mounting component, the head support component, and the arm support component may preferably work together so that when the seatback mounting component is releasably attached to the seatback, the head/neck support member may be engaged with the at least a portion of the user's head, and the at least one of the user's arms may be received into the interior pouch portion of the arm support component, one or more upward, diagonal forces is generated sufficient to support the user's head and the at least one arm of the user while the user is seated and positioned approximately in a vertical position. The seatback mounting component may further comprise a head cushion member, wherein the head cushion member may be configured to engage with a portion of a back of the user's head when the user is seated. The seatback mounting component may further comprise a fastening assembly attached to the head cushion member and configured to engage with at least a portion of an uppermost portion of the seatback to releasably attach the travel comfort device to the seatback. The fastening assembly may comprise at least one hanger member configured to engage the uppermost portion of the seatback. The seatback mounting component may comprise a mounting cap attached to the head cushion member and configured to engage with at least a portion of an uppermost portion of the seatback to releasably attach the travel comfort device to the seatback. At least a portion of the mounting cap may comprise an elastic material. An exterior surface of the bib member may comprise at least one pocket and/or an auxiliary arm support pocket configured to receive the at least one arm of the user. The at least one arm support component fastening member and the at least one head support component fastening member may be adjustable.

In another embodiment, the travel comfort device may comprise: a seatback mounting component comprising an attachment mechanism configured to releasably attach to a seatback of a seat to be occupied by a user, and a head cushion member configured to engage with a portion of a back of the user's head when the user is seated; and an arm support component comprising a bib member and at least one arm support component fastening member for releasably attaching the bib member to the seatback mounting component; wherein the bib member comprises an exterior surface surrounding and forming an interior pouch portion, wherein the interior pouch portion is configured to receive at least one of the user's arms.

Still other advantages, aspects and features of the subject disclosure will become readily apparent to those skilled in the art from the following description wherein there is shown and described a preferred embodiment of the present disclosure, simply by way of illustration of one of the best modes best suited to carry out the subject disclosure. As it will be realized, the present disclosure is capable of other different embodiments and its several details are capable of modifications in various obvious aspects all without departing from the scope herein. Accordingly, the drawings and descriptions will be regarded as illustrative in nature and not as restrictive.

BRIEF DESCRIPTION OF THE DRAWINGS

The accompanying drawings incorporated herein and forming a part of the specification illustrate example embodiments.

The drawings show illustrative embodiments, but do not depict all embodiments. Other embodiments may be used in addition to or instead of the illustrative embodiments. Details that may be apparent or unnecessary may be omitted for the purpose of saving space or for more effective illustrations. Some embodiments may be practiced with additional components or steps and/or without some or all components or steps provided in the illustrations. When different drawings contain the same numeral, that numeral refers to the same or similar components or steps.

DETAILED DESCRIPTION OF ILLUSTRATIVE EMBODIMENTS

Figure 1:
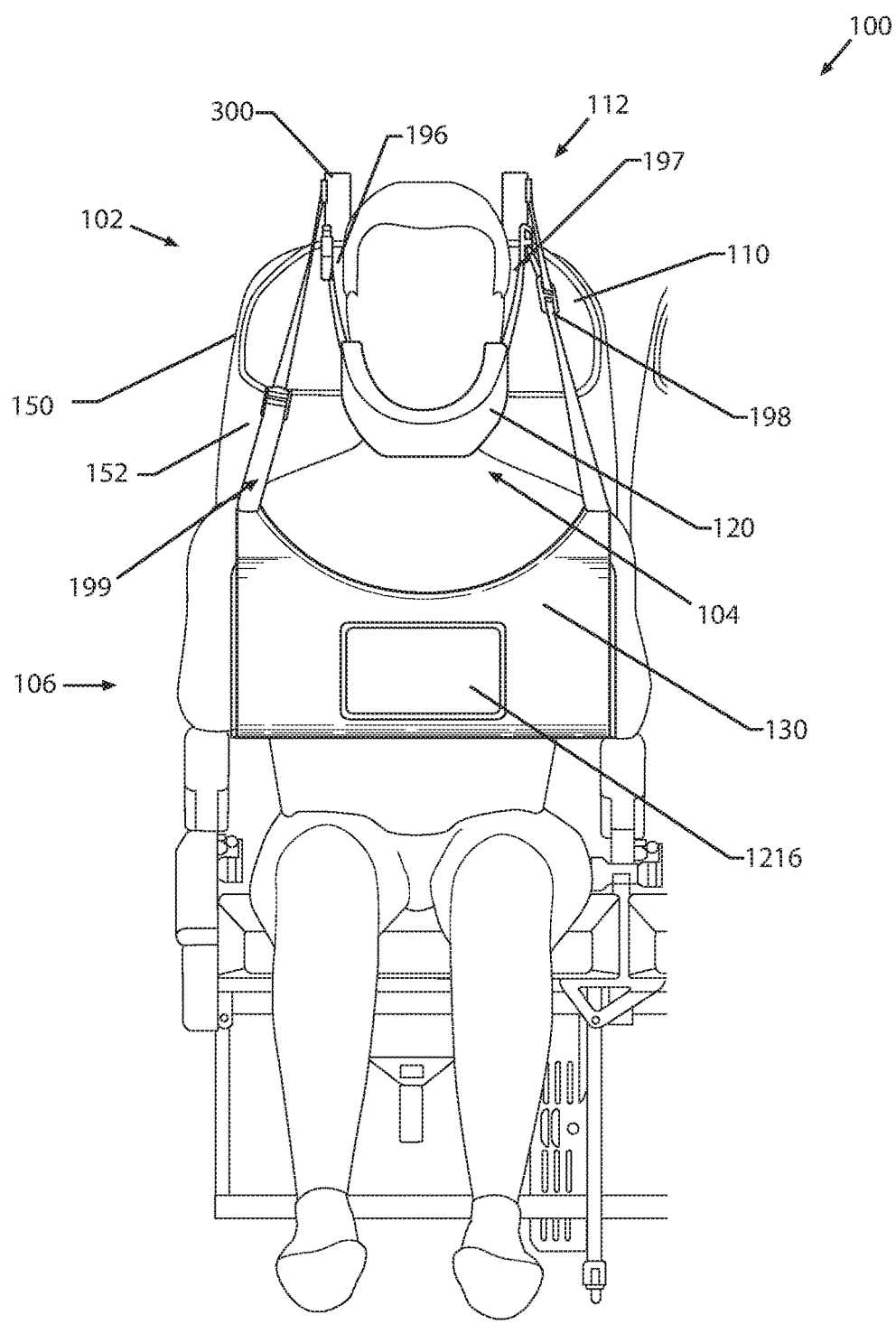
FIG. 1 illustrates a front view of one embodiment of a travel comfort device according to the present disclosure.

In the following detailed description of various embodiments, numerous specific details are set forth in order to provide a thorough understanding of various aspects of one or more embodiments. However, these embodiments may be practiced without some or all of these specific details. In other instances, well-known methods, procedures, and/or components have not been described in detail so as not to unnecessarily obscure aspects of embodiments of the present disclosure.

While multiple embodiments are disclosed, other embodiments will become apparent to those skilled in the art from the following detailed description, which shows and describes illustrative embodiments. As will be realized, the system and method described herein is capable of modifications in various obvious aspects, all without departing from the spirit and scope of protection. Accordingly, the graphs, figures, and the detailed descriptions thereof, are to be regarded as illustrative in nature and not restrictive. Also, the reference or non-reference to a particular embodiment of the disclosure shall not be interpreted to limit the scope of the disclosure.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 1-10% from the indicated number or range of numbers.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In general, the embodiments herein provide a travel comfort device designed to be used when the traveler is at rest or asleep in a seated position in a transportation vehicle, such as an airplane, motor vehicle, train, and the like. The travel comfort device provides passengers with a comfortable traveling experience by, in part, securing and/or supporting a user's head and arms.

Figure 5:
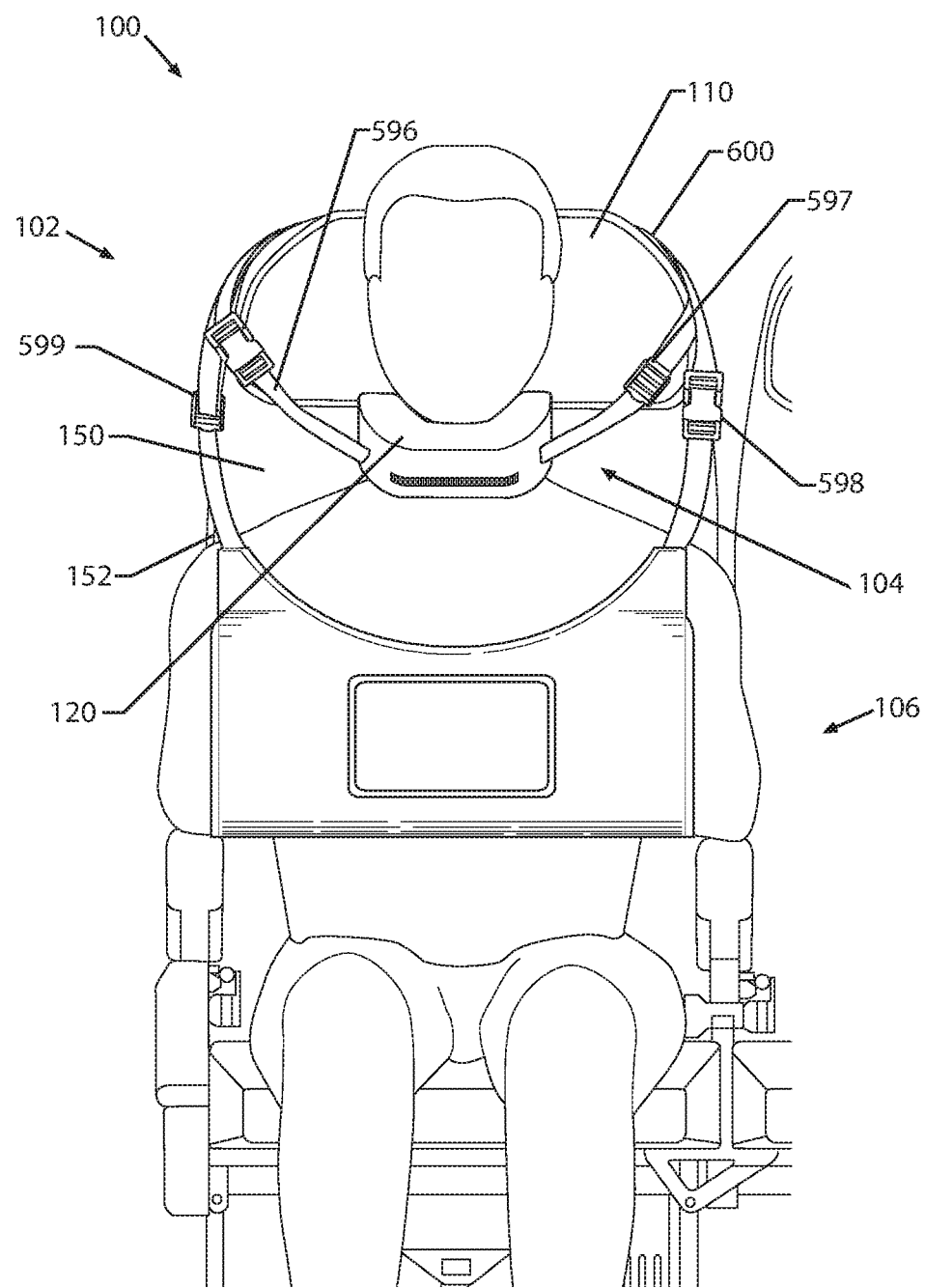
FIG. 5 illustrates a front view of one embodiment of a travel comfort device according to the present disclosure.

In accordance with the embodiments herein, as shown in FIG. 1 and FIG. 5, the present disclosure may comprise a travel comfort device 100 comprising a seatback mounting component 102, a head support component 104, and an arm support component 106. The seatback mounting component 102 may be configured to releasably engage or attach to a headrest and/or uppermost portion of the seatback 150 of a seat 152 of a transportation vehicle. As used herein, the term "headrest" refers to the uppermost portion of the seatback of a seat to which the seatback mounting component may be attached. The head support component 104 may be configured to releasably engage or attach to the seatback mounting component 102. The arm support component 106 may be configured to be releasably engaged or attached to the seatback mounting component 102.

In accordance with the embodiments herein, the travel comfort device 100 may comprise a seatback mounting component 102, which may comprise a head cushion member 110 and one or more attachment mechanisms 112, which may be configured to be releasably attached to the headrest 150 of the seat 152 to which the passenger has been assigned or will occupy during travel. In a preferred embodiment, the seatback mounting component 102 may releasably attach with a plurality of, and more preferably, a majority of, seatback types and/or configurations found in airplanes, motor vehicles, trains, and the like. As an example, an airline carrier may have several different models of aircraft, each having different seat configurations and dimensions. An aircraft model may also have several different seat classes, such as first class, business class, economy plus, and economy, with each class of seats having different dimensions. The seatback mounting component 102 of the present disclosure is configured to releasably attach to the majority of these different seatback configurations and dimensions. In a preferred embodiment, the seatback mounting component 102 is configured to releasably attach to most seatback configurations and dimensions found in common carrier vehicles with only minimal effort or adjustment by the user of the travel comfort device.

Figure 2:
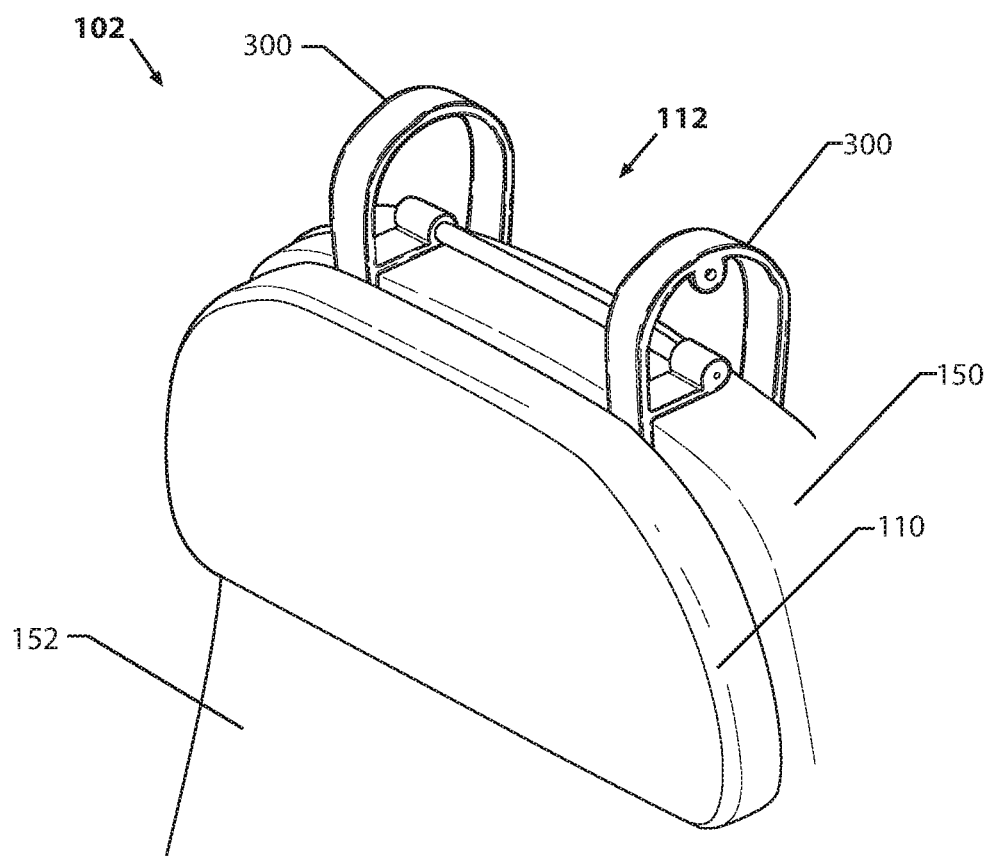
FIG. 2 illustrates a perspective view of one embodiment of the seatback mounting component of a travel comfort device according to the present disclosure.

In one embodiment, as shown in FIG. 2, the head cushion member 110 is configured to support the back portion of the user's head when the user is in a seated position in the seat to which the travel comfort device may be attached. The head cushion member 110 may be sized and shaped to generally align with the contours of the majority of different seatback configurations and dimensions found in common carrier vehicles. In one embodiment, as shown in FIG. 2, the head cushion member 110 may have a generally rounded rectangular shape to align with the generally rounded rectangular shape of the associated headrest and a thickness sufficient to provide support to the user's head when resting thereupon. It is understood however, that the head cushion member 110 may be of any other suitable shape and dimension as is known in the art, such that it may provide sufficient support to the user's head.

The head cushion member 110 may comprise any suitable material having the density and/or give to provide the proper support and comfort to the back of the user's head. In one embodiment, the head cushion member 110 may comprise a cushion material and/or foam material as is known in the art. Examples of such materials include, but are not limited to, polyurethane, expanded polyethylene, expanded polypropylene, expanded polystyrene or blends, natural fiber batting such as cotton or synthetic fiber, and combinations thereof. The cushion or foam material may be molded, cut, ground, or otherwise shaped as is known in the art. In one embodiment, the head cushion member 110 may further comprise a backing member (not shown) attached to the cushion or foam material, wherein the backing member is configured to contact the headrest of the seat when the travel comfort device is attached thereto. The backing member may provide additional support for the user's head and protection of the cushion or foam material from contact with the headrest. The backing member may be any durable and light weight material, such as plastic, rubber, and the like. The backing member is attached to the cushion or foam material by any suitable means, such as adhesives, heat seal, bonding means, fastening devices, and the like.

The seatback mounting component 102 may further comprise attachment mechanism 112 configured to be releasably attached to the headrest 150 of the seat or seatback 152 to which the passenger has been assigned or will occupy during travel. In one embodiment, as shown in FIG. 2, the attachment mechanism 112 may comprise a fastening assembly 300 that may attach to the head cushion member 110 and may be configured to engage with at least a portion of the headrest 150 of the seatback 152 to releasably attach the travel comfort device 100 to the seatback 152.

FIG. 1 shows that the travel comfort device 100 may comprise fastening members 196, 197, 198, 199 that preferably connect the attachment mechanism 112 (or more specifically, the fastening assembly 300) to the head support component 104 and to the arm support component 106.

FIG. 5 shows that the travel comfort device 100 may comprise fastening members 596, 597, 598, 599 that preferably connect the attachment mechanism 112 (or more specifically, the mounting cap 600) to the head support component 104 and to the arm support component 106.

Figure 3A:
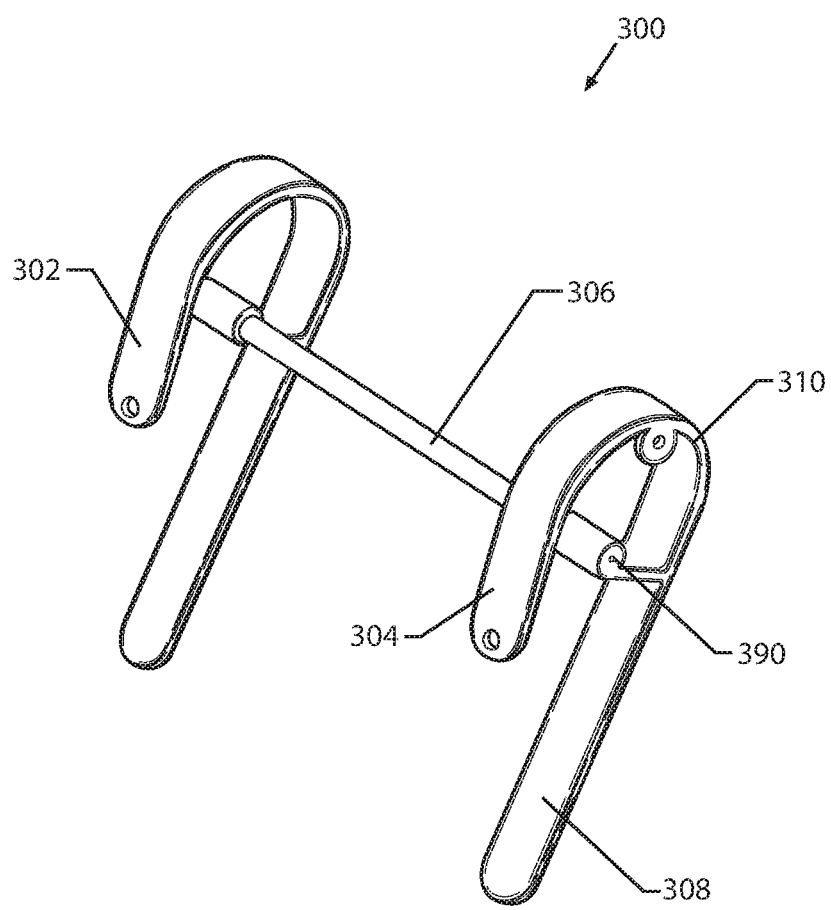
FIGS. 3A-D illustrate views of one embodiment of fastening assembly of a seatback mounting component of a travel comfort device according to the present disclosure.

As shown in FIG. 3A, the fastening assembly 300 may comprise two hanger members 302 and 304 connected by a connection member 306. The two hanger members 302 and 304 and connection member 306 may be restrained via elastomeric cord 390, which may be a bungee cord. The elastomeric cord may be restrained at the end of the two hanger members 302 and 304 and attachment member's 324 sockets via said knots or other fastening means. The elastomeric cord 390 may force the attachment member's 324 socket engagements against connection member 306 to facilitate assembly and disassembly of fastening assembly 300 for compact storage. In accordance with one embodiment, each hanger member 302, 304 may comprise a straight portion 308 and a curved generally semi-circular shaped portion 310 extending therefrom.

Figure 3B:
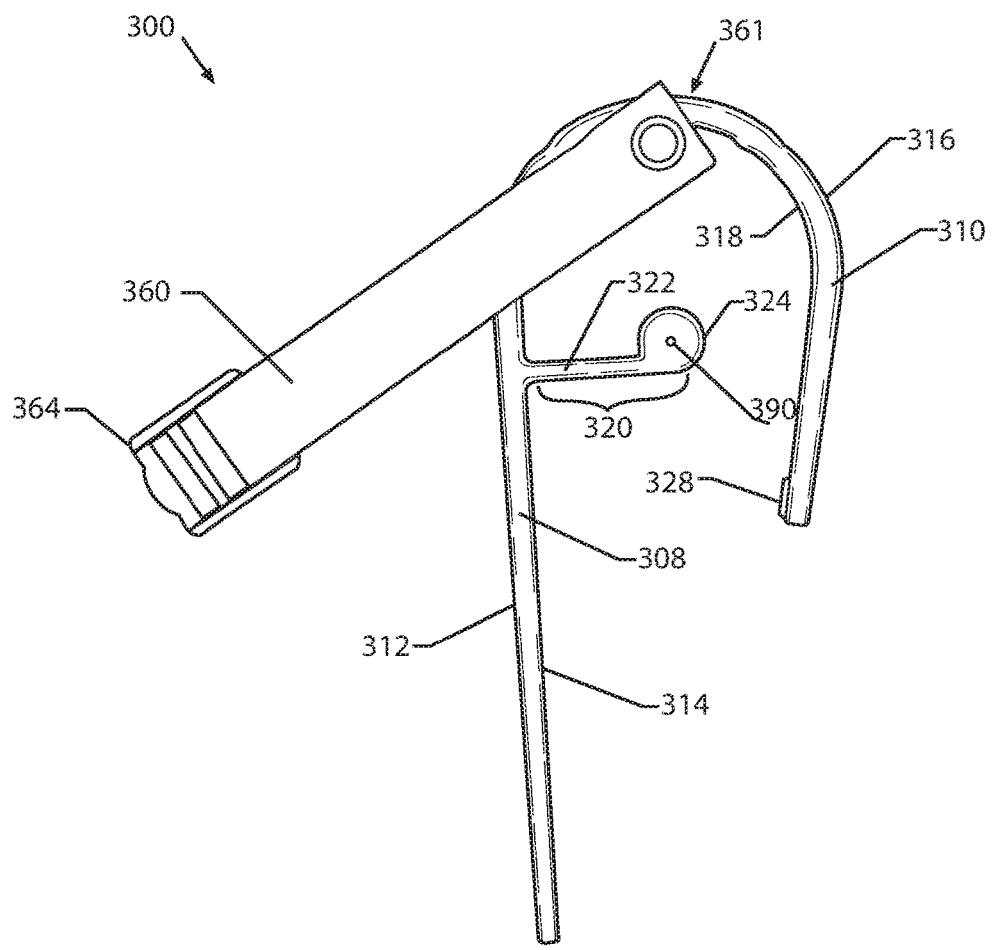

As shown in FIG. 3B, the straight portion 308 may comprise an exterior side 312 and an interior side 314 that may be configured to be in contact with the back of the headrest 150 when attached thereto. The curved portion may comprise an exterior side 316 and an interior side 318 configured to contact a top and back of the headrest 150 when attached thereto. In accordance with one embodiment, each hanger member 302, 304 may comprise a connection member attachment portion 320 extending from the interior side 314 of the straight portion 308 for attachment of the connection member 306 thereto.

The hanger members 302, 304 may comprise any suitable material of sufficient durability, spring memory and strength to flexibly engage with the headrest and securely attach the travel comfort device to the headrest for use by the user. Examples of suitable materials include, but are not limited to, molded plastic, metal, wood, and the like, and combinations thereof. In a preferred embodiment, portions of the hanger members may be formed by injection molding thereof of a thermoplastic material, such as polyamide (Nylon), polyethylene, polypropylene, and polystyrene.

The configuration and dimensions of the hanger members 302, 304 are preferably such so as to allow the hanger members 302, 304 to releasably, but securely, attach to many or most seatback configurations and dimensions found in common carrier vehicles.

Figure 3C:
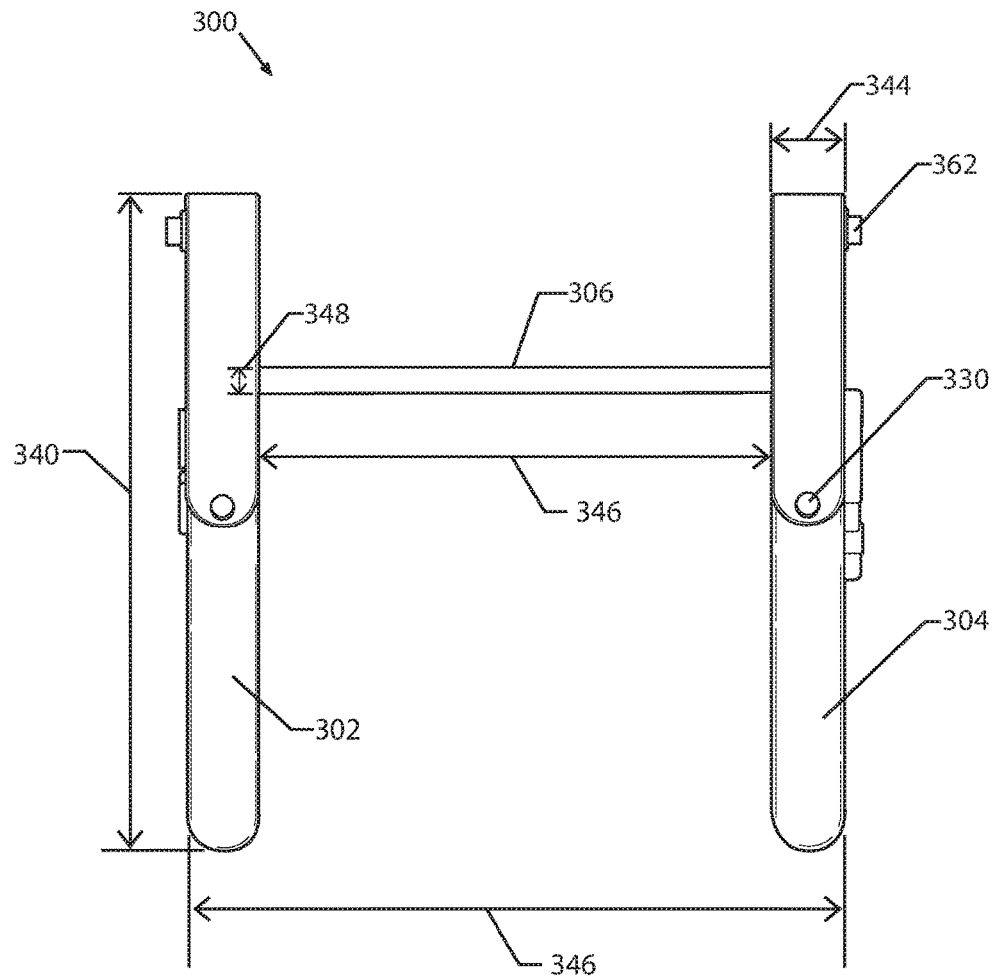
Figure 3D:
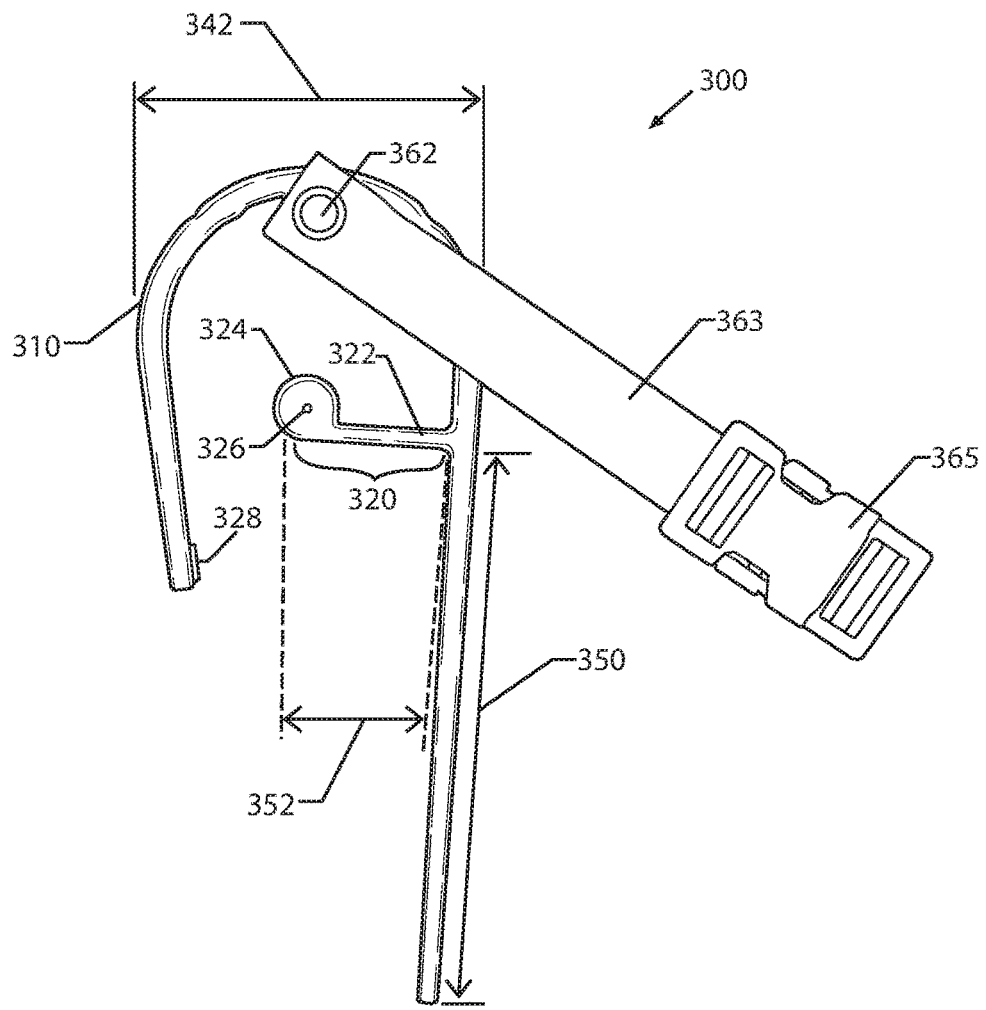

In a preferred embodiment, each hanger member 302, 304 may have a height 340 from the bottom of the straight portion 308 to the top of the curved portion 310 of approximately 5 to 12 inches, and more preferably, approximately 9 inches. As shown in FIG. 3D, the curved portion 310 of each hanger member 302, 304 may have a diameter 342 at the widest portion thereof of approximately 2 to 7 inches, and more preferably, approximately 4 inches. As shown in FIG. 3C, each hanger member 302, 304 may have a width across 344 of approximately 0.2 to 5 inches, and more preferably, approximately 1 inch.

In a preferred embodiment, the hanger members 302, 304 may be connected to each other via connection member 306 spanning the distance between the two members. In a preferred embodiment, the connection member 306 may be a cylindrical, square or rectangular hollow tube, which extends between the two members 302, 304 and having opposing ends configured for attachment to one of the hanger members 302, 304. The pre-stretched elastomeric cord 390 may insert inside connection member 306, and attach to both ends of the two hanger members 302 and 304 via knots or similar fastening means. The connection member 306 may comprise any suitable material of sufficient durability and strength to allow the fastening assembly 300 to engage with the headrest 150 and securely attach the travel comfort device 100 to the headrest 152 for use by the user. Examples of suitable materials may include, but are not limited to, molded plastic, metal, wood, and the like, and combinations thereof. In a preferred embodiment, the connection member 306 may be formed by injection molding thereof of a thermoplastic material, such as polyamide, polyethylene, polypropylene, and polystyrene.

The configuration and dimensions of the connection member 306 may preferably allow the fastening assembly 300 to releasably attach to most seatback configurations and dimensions found in common carrier vehicles. In a preferred embodiment, as shown in FIG. 3C, the length 346 of the connection member 306 may be approximately 7 inches and a diameter 348 of approximately 0.3 to 4 inches, and more preferably, approximately 0.4 inches In a preferred embodiment, each opposing end of the connection member 306 is attached to each hanger member 302, 304 by connection member attachment portion 320 extending from the interior side 314 of the straight portion 308 of each hanger member. The connection member attachment portion 320 is any suitable attachment mechanism that will securely attach or secure the connection member 306 to each hanger member 302, 304. Examples, include, but are not limited to fabrication of the connection member and hanger members as a unitary component, fastening devices, such as nails, screws, and the like, adhesive devices, male/female connection devices, tube and socket with elastomeric restrainer member such as Bungee cord, and the like, and combinations thereof.

In a preferred embodiment, the connection member attachment portion 320 may comprise an extension member 322 extending from the interior side 314 of the straight portion 308 of each hanger member and terminating with an attachment member 324 configured for attachment to (or integrally part of, an end of the connection member 306. The attachment member 324 may be any suitable attachment mechanism as set forth above. In a preferred embodiment, as shown in FIGS. 3B and 3D, the attachment member 324 is generally circular shaped and includes an aperture 326 configured to receive a fastening device to securely attach an end of the connection member 306 to the hanger member 302, 304. The extension member 322 may extend from the interior side 314 of the straight portion 308 of each hanger member 302, 304 at a height 350 and an extension distance therefrom 352, wherein when the connection member 306 may be attached thereto it may allow for the fastening assembly 300 to securely engage with the headrest 152 when the travel comfort device 100 is in use.

In a preferred embodiment, as shown in FIG. 3D, the height 350 may be approximately 2 to 8 inches, and more preferably approximately 5 inches. In a preferred embodiment, as shown in FIG. 3D, the length 352 may be approximately 0.5 to 5 inches, and more preferably approximately 2.5 inches.

As shown in FIG. 3D, the hanger members 302, 304 may further include padding 328 attached to the interior side 318 of the curved portion 310 located near the end of the curved portion 310 and configured to assist with engagement of the hanger members 302, 304 with the headrest 150 of the seatback 152 when the travel comfort device is in use. The padding may be any suitable material known in the art, including, but not limited to, natural or synthetic rubber, polyurethane, polyethylene, polypropylene, polystyrene, and the like and combinations thereof. The padding may be attached by any suitable means are may be an extension of the hanger member 302, 304. As further shown in FIG. 3C, the hanger members 302, 304 may further include an adjustable spring component 330 located on the exterior side 316 of the curved portion 310 near the end of the curved portion and configured to assist with engagement of the hanger member with the headrest 150 of the seatback 152 when the device is in use. The adjustable spring component is any suitable spring mechanism known in the art. The adjustable spring may be formed as part of the curved portion or attached thereto by any means known in the art.

The hanger assembly 300 is configured to securably attach to the head cushion member 110 by any suitable mechanism, including, but are not limited to, fabrication of the head cushion member and hanger members as a unitary component, fastening devices, such as nails, screws, and the like, adhesive devices, male/female connection devices, and the like, and combinations thereof. In a preferred embodiment, as shown in FIG. 2, the exterior side 312 of the straight portion 308 of each hanger member 302, 304 may be attached to the back of the head cushion member 110 in such a manner that when the travel comfort device 100 is releasably attached to the headrest 150, the back of the head cushion member 110 is in contact with, engaged with, or in close proximity to, a portion of the front of the headrest 150 and the front of the head cushion member 110 is facing forward to be in contact with the back of the user's head when in use.

In operation, when the seatback mounting component 102 is mounted on the headrest 150 of the seatback 152, the hanger assembly 300 functions to engage with at least a portion of the front, top, and back of the headrest 150 to securely attach the travel comfort device thereto. In a preferred embodiment, in operation, (1) a portion of the interior side 318 of the curved portion 310 of each hanger member is in contact or engaged with a portion of the back of the headrest 150; (2) at least a portion of the interior side 314 of the straight portion 308 of each hanger member 302, 304 is in contact or engaged with a portion of the front of the headrest 150; and (3) the bottom surface of each of the extension members 322 of the connection member attachment portion 320 and the bottom surface of the connection member 308 are in contact or engaged with a portion of the top of the headrest 150. This engagement of the hanger assembly 300 with the headrest functions to place the back of the cushion member 110 to be aligned with and/or in contact with a portion of the front of the headrest 150 to provide additional support and/or comfort to the back of the user's head when in operation and to securely attach the travel comfort device 100 to the headrest 150.

Figure 4:
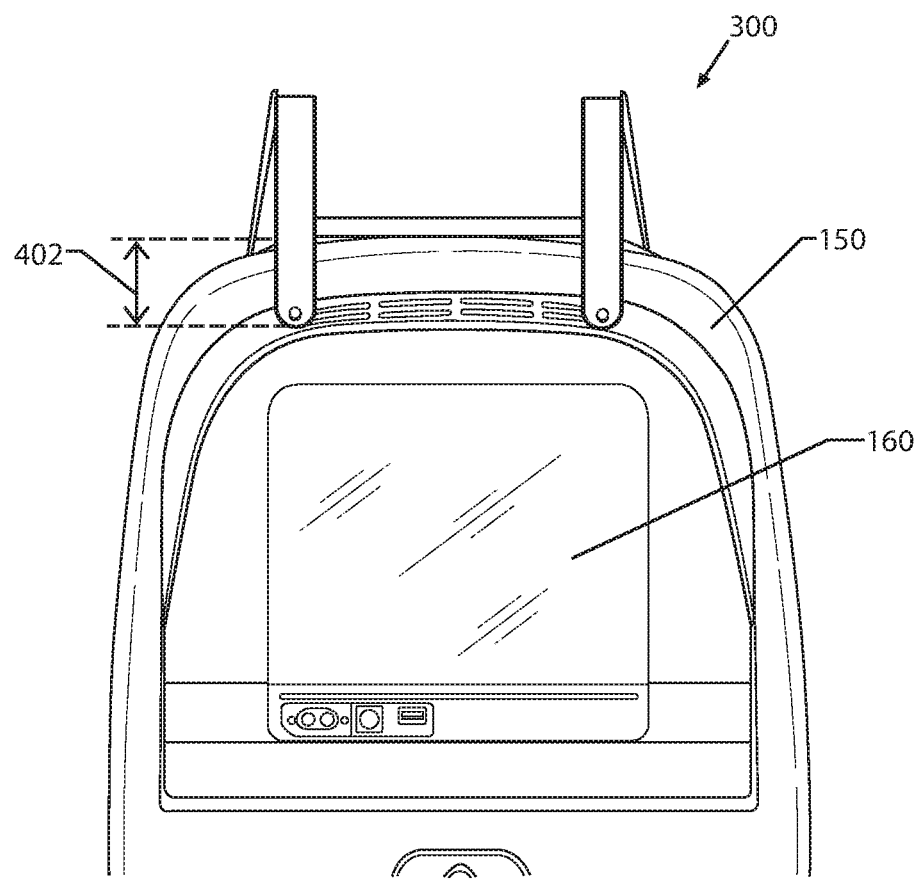
FIG. 4 illustrate posterior views of one embodiment of a fastening assembly of a seatback mounting component of a travel comfort device according to the present disclosure.

In accordance with one embodiment of the present disclosure, the seatback mounting component 102 is configured to releasably attach with the headrest 150 such that the seatback mounting component 102 preferably does not interfere with any multimedia entertainment device or other pockets or features located on the back of the seat 152 for the entertainment or benefit of the passenger in the seat behind the user. In a preferred embodiment, as shown in FIG. 4, the hanger assembly 300 is configured to engage with the headrest 152 so as to not overlap with or cover a substantial portion of any entertainment device 160 or other features (not shown), such as a pocket, located on the back of the seat to which the travel comfort device 100 is attached. In a preferred embodiment, the curved portion 310 of each hanger member(s) 302, 304 may be in contact with a limited area of the back of the headrest so as to not overlap with or cover a substantial portion of any entertainment device 160 or other feature. In a preferred embodiment, the length 402 of the curved portion of each hanger member that extends onto and is in contact with the back of the headrest is approximately 0.25 to 4 inches, and preferably approximately 1 inch.

The seatback mounting component 102 may further include one or more fastening members for releasably engaging or attaching the head/neck support component 104 and/or the arm support component 106 thereto. As shown in FIGS. 3B and 3D, the fastening assembly 300 includes at least one fastening member 360 attached to the uppermost portion 361 of the curved portion 310, and extending outward past the straight portion 308 towards the head/neck support component 104 and/or the arm support component 106 for attachment thereto. The fastening member 360 is attached to the curved portion via a stud connection 362, although any suitable attachment method may be used. As show in FIGS. 3B and 3D, the fastening member(s) 360, 363 may be a flexible strap and may comprise connecting portions 364, 365.

Figure 6A:
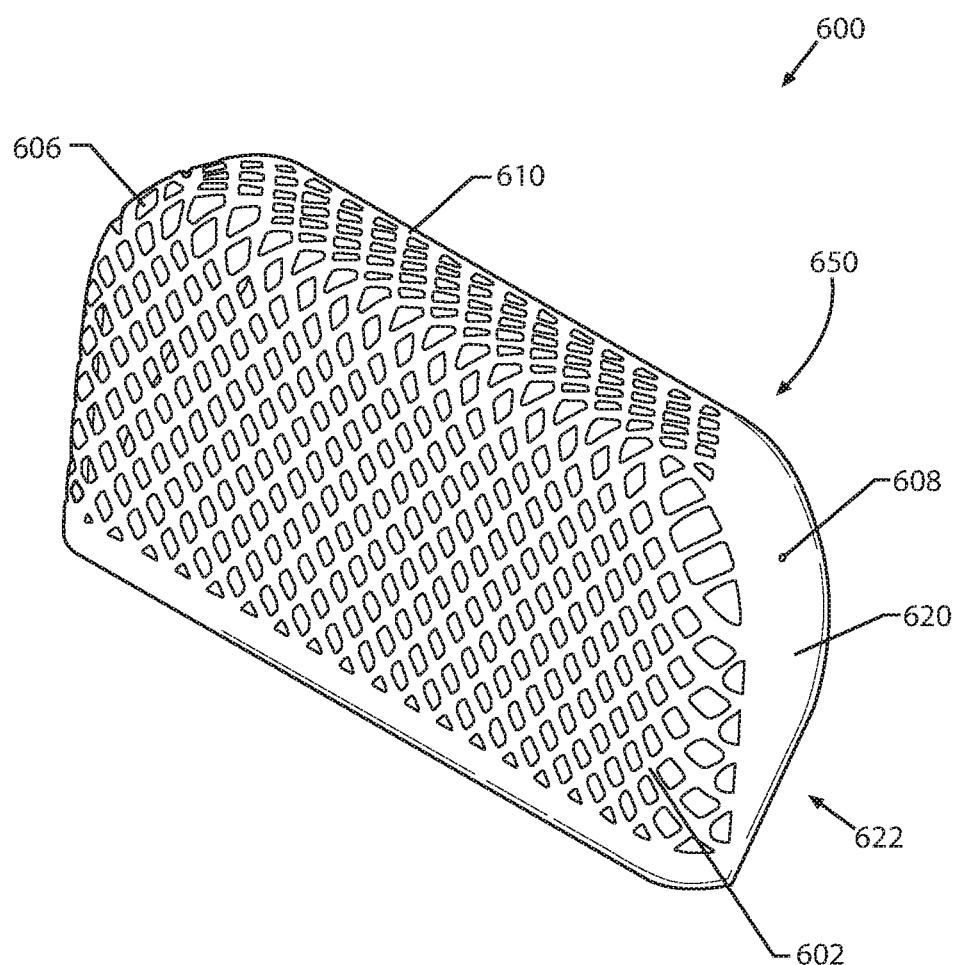
FIGS. 6A-C illustrate views of one embodiment of cap member of a seatback mounting component of a travel comfort device according to the present disclosure.
Figure 6B:
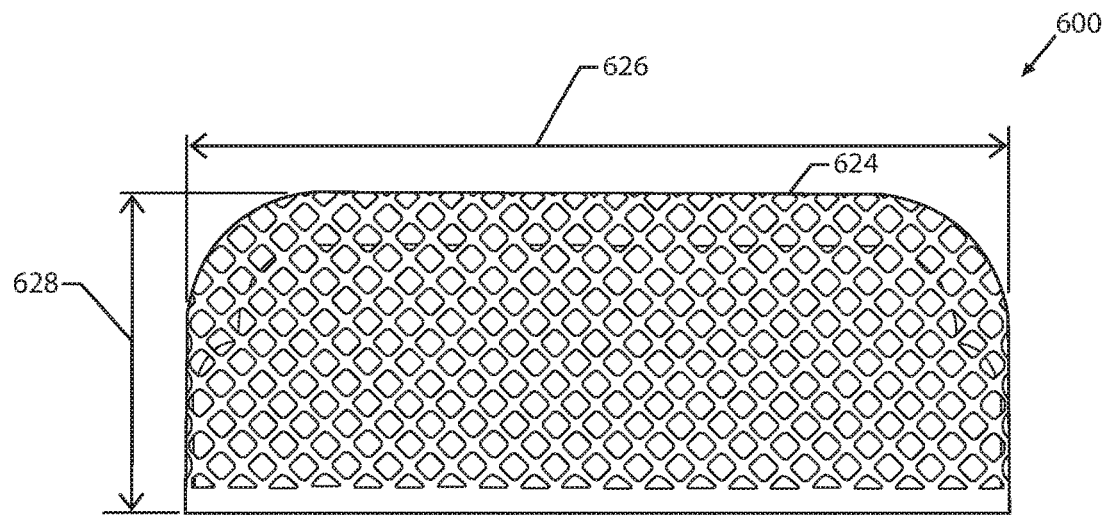
Figure 6C:
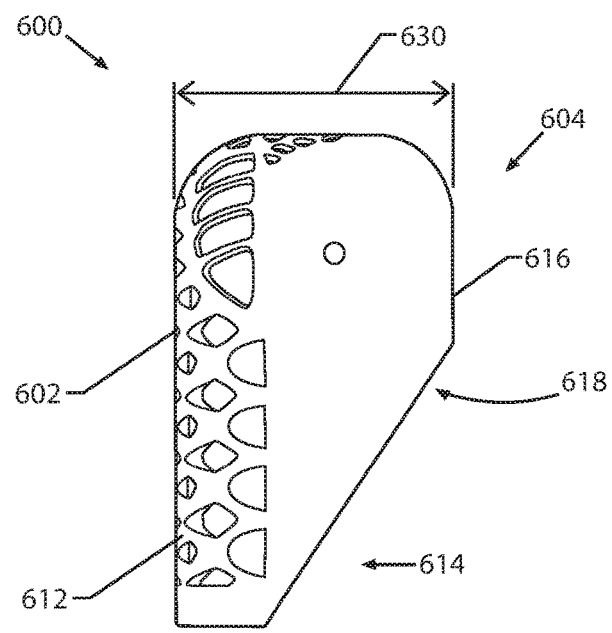

In one embodiment, as shown in FIGS. 6A-6C, the attachment mechanism 112 may alternatively comprise a mounting cap 600 (rather than, or in addition to, fastening assembly 300) that may be configured to attach to head cushion member 110 and may be configured to engage with at least a portion of the headrest 150 of the seatback 152 to releasably attach the travel comfort device to the seatback 152. As shown in FIGS. 6A-C, the mounting cap 600 may preferably be sized and shaped to generally align with the contours of some, most, and/or a majority of different seatback configurations and dimensions found in common carrier transportation vehicles. In one embodiment, as shown in FIGS. 6A-C, the mounting cap 600 has a generally rounded rectangular shape and is similar in shape to the head cushion member 110, which may be attached thereto. In addition, the mounting cap 600 has a width and depth of similar dimensions of most of the headrests found in common carrier transportation vehicles so as to be mounted onto and cover at least a portion of the headrest 150 for releasably attaching the travel comfort device 100 thereto.

In a preferred embodiment, as shown in FIGS. 6A-6C, the mounting cap 600 may have a front region 602, a back region 604 opposite the front region, two opposing end regions 606 and 608 connecting the front and back regions, and a top region 610 extending between the front and back regions. The front region 602 may have an exterior surface 612 and an interior surface 614, wherein when the mounting cap 600 is attached to the headrest, the exterior surface 612 of the front region is preferably in contact with the back of the head cushion member 108 and the interior surface 614 is preferably in contact with front surface of the headrest 150. The back region 604 may have an exterior surface 616 and an interior surface 618, wherein when the mounting cap 600 may be attached to the headrest 150, the interior surface 618 may be in contact with at least a portion of the back of the headrest 150. The two opposing end regions 606 and 608 may each comprise an exterior surface 620 and an interior surface 622, wherein each interior surface 622 may be configured to be in contact with a portion of a side surface of the headrest 150 when the mounting cap 600 is attached thereto. The top region 610 may comprise an exterior surface 624 and an interior surface (opposite the exterior surface 624), wherein when the mounting cap 600 is attached to the headrest 150, the interior surface is in contact with a portion of the top of the headrest 150. The front region 602, back region 604, opposing end regions 606, 608, and top region 610 form an interior portion 650 configured and shaped to receive (and/or matingly engage with) at least a portion of the headrest 150 therein.

The front region 602, the back region 604, the opposing end regions 606, 608, and the top region 610 may all be generally sized and shaped to generally align with the contours of some, most, and/or a majority of different seatback configurations and dimensions found in common carrier vehicles. In a preferred embodiment, as shown in FIG. 6B, the mounting cap 600 may have a length 626 of approximately 12 to 30 inches, and more preferably, approximately 16 inches. In a preferred embodiment, the mounting cap 600 may have a height 628 of approximately 2 to 10 inches, and more preferably, approximately 6.2 inches. As shown in FIG. 6C, in a preferred embodiment, the mounting cap 600 may have a depth 630 of approximately 1 to 7 inches, and more preferably, approximately 3.5 inches.

The mounting cap 600 may comprise any suitable material that will engage with and releasably attach to the headrest 150 to securely, but removeably attach the travel comfort device 100 thereto. In a preferred embodiment, the mounting cap comprises an elastic, flexible, and/or rubber material that is stretchable to allow the mounting cap 600 to expand and/or contract to accommodate different seatback configurations and dimensions found in common carrier vehicles. In a preferred embodiment, the mounting cap 600 may be configured such that is able to releasably attach to headrests having a length across ranging from approximately 16 inches to 18 inches. Examples of suitable elastic or rubber materials include, but are not limited to, synthetic or natural rubber, elastic polymers, or fibers, woven or non-woven elastic materials, braided or knitted elastics, injection molded elastomeric, or any other elastic substance readily available. In a preferred embodiment, selected portions of the mounting cap 600, such as the corners or edges, may comprise additional materials to provide structure and/or assist with the engagement of the mounting cap 600 to the headrest. In one embodiment, the corners and edges may comprise material that is stiffer than the material used for the rest of the mounting cap 600.

The mounting cap 600 may preferably be securably attached to the head cushion member 110 by any suitable device, including, but not limited to, fabrication of the head cushion member and mounting cap as a unitary component, fastening devices, adhesive devices, and the like, and combinations thereof.

In accordance with one embodiment of the present disclosure, the seatback mounting component 102 may be configured to releasably attach with the headrest 150 such that the seatback mounting component 102 does not interfere with any multimedia entertainment device 160 or other features located on the back of the seatback 152 to which it is mounted for the entertainment or benefit of the passenger in the seat behind.

Figure 7:
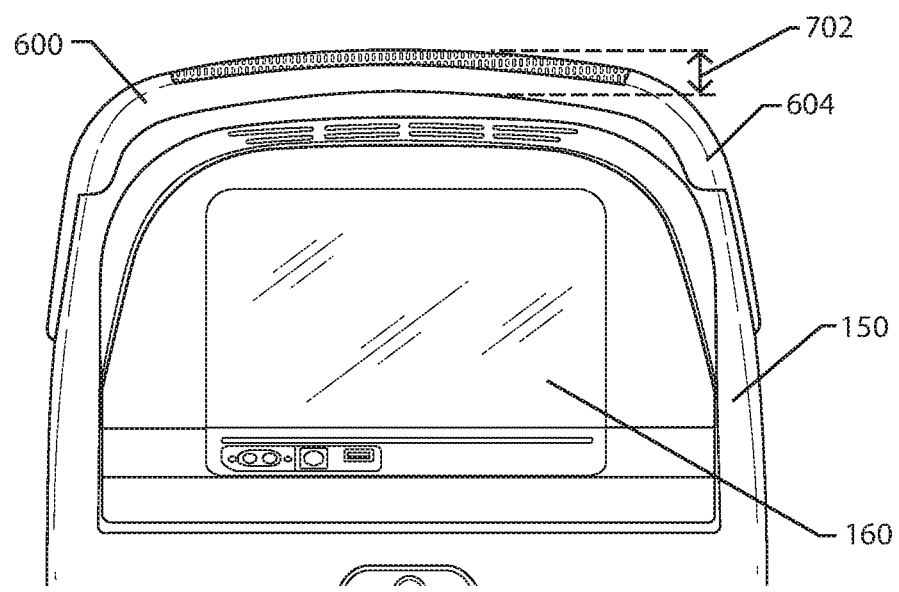
FIG. 7 illustrates a posterior view of one embodiment of a cap member of a seatback mounting component of a travel comfort device according to the present disclosure.

In a preferred embodiment, as shown in FIG. 7, the mounting cap 600 may be configured to engage with the headrest 152 so as to not overlap with or cover a substantial portion of any entertainment device 160 or other feature (not shown) located on the back of the seat to which the travel comfort device 100 is attached. In a preferred embodiment, the back region 604 of mounting cap 600 may be in contact with a limited area of the back of the headrest 150 so as to not overlap with or cover a substantial portion of any entertainment device 160 or other feature. In a preferred embodiment, the length 702 of the back region 604 that extends onto and is in contact with the back of the headrest is approximately 0.25 to 5 inches, and is preferably approximately 1 inch.

As shown in FIGS. 1 and 5, the seatback mounting component 102 and the head/neck support component 104 and/or the arm support component 106 may be configured to releasably attach via one or more fastening members 196, 197, 198, 199, 596, 597, 598, 599 for releasably engaging or attaching the thereto.

As shown in FIG. 1, the fastening members 196, 197 may be straps that releasably connect the fastening assembly 300 to the head support component 104. The fastening members 196, 197 may each have a buckle that allows the user to easily secure and release the head support component 104 to the fastening assembly 300.

As shown in FIG. 1, the fastening members 198, 199 may be straps that releasably connect the fastening assembly 300 to the arm support component 106. The fastening members 198, 199 may each have a buckle that allows the user to easily secure and release the arm support component to the fastening assembly 300.

As shown in FIG. 5, the fastening members 596, 597 may be straps that releasably connect the mounting cap 600 to the head support component 104. The fastening members 596, 597 may each have a buckle that allows the user to easily secure and release the head support component 104 to the mounting cap 600.

As shown in FIG. 5, the fastening members 598, 599 may be straps that releasably connect the mounting cap 600 to the arm support component 106. The fastening members 598, 599 may each have a buckle that allows the user to easily secure and release the arm support component to the mounting cap 600.

In accordance with one embodiment of the present disclosure, as shown in FIGS. 1 and 5, the head support component 104 comprises a head/neck support member 120 and at least one fastening member 196, 197, 198, 199, 596, 597, 598, 599 for releasably attaching the head/neck support member to the seatback mounting component 102. The head/neck support member 120 may be configured to engage with a portion of the user's head and/or neck to provide support and stability to the user's head and neck while sleeping or resting in a vertical or near-vertical position. The head/neck support member 120 may provide support to the head and neck to prevent forward and lateral bending while the user is relaxed or asleep while in a seated position.

Figure 8A:
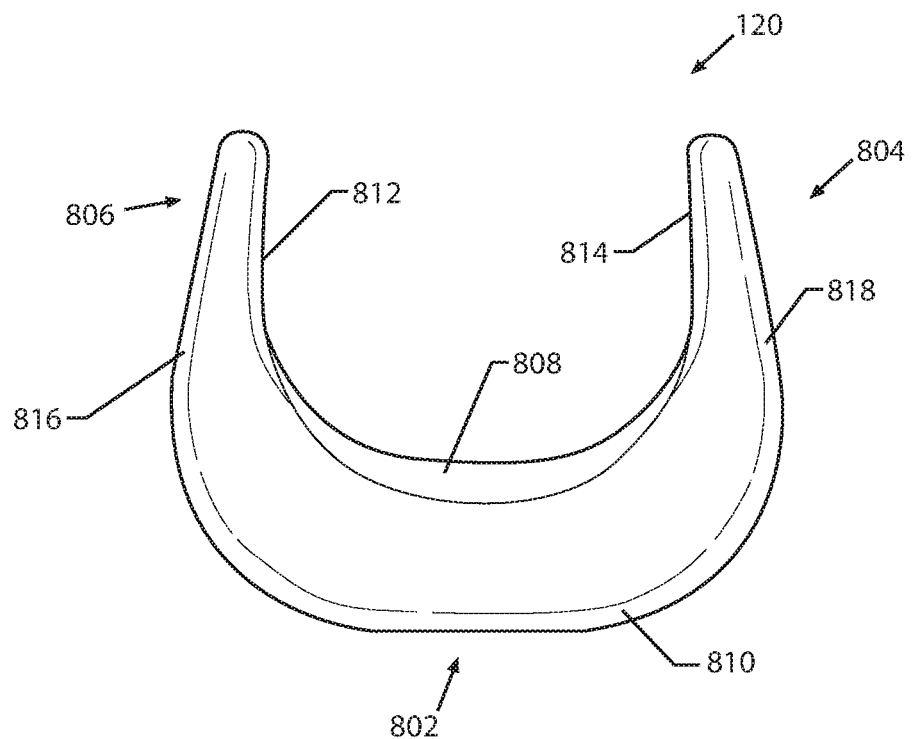
FIG. 8A-C illustrate views of one embodiment of a head/neck support member of a head support component of a travel comfort device according to the present disclosure.
Figure 8B:
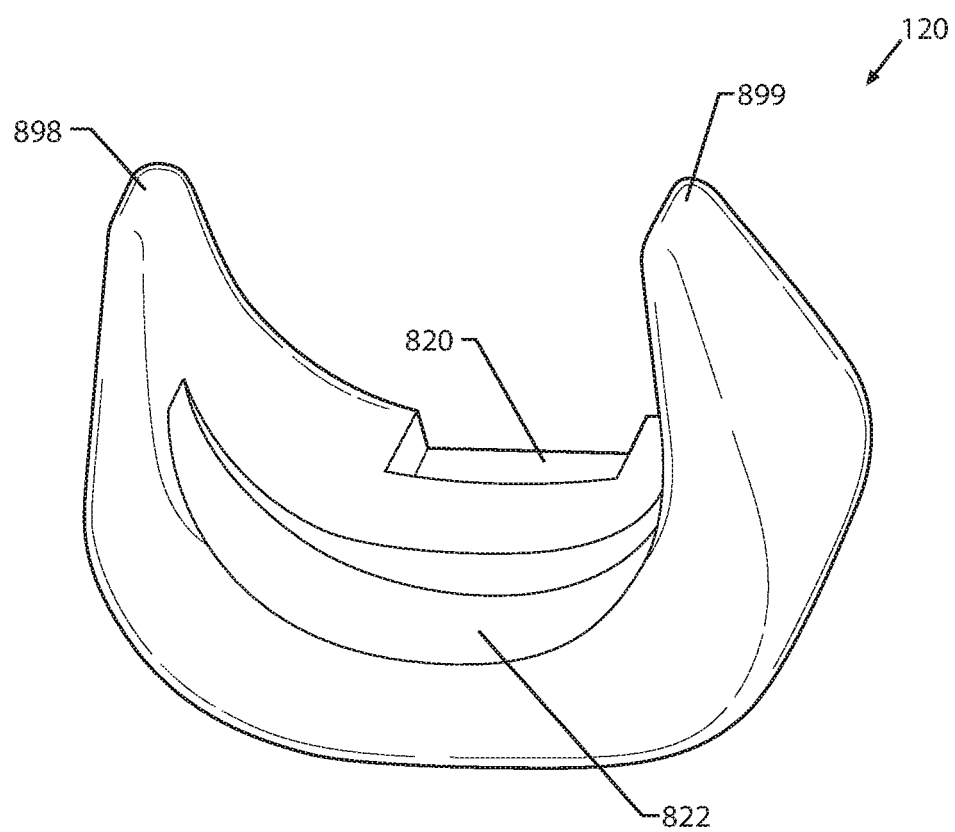
Figure 8C:
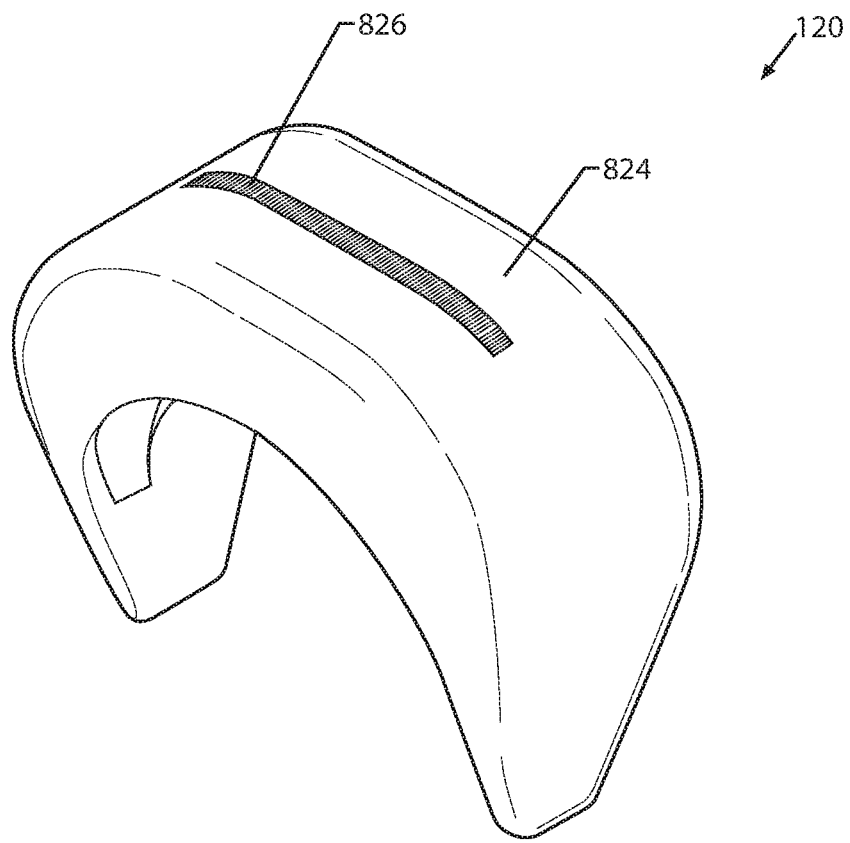

In a preferred embodiment, as shown in FIGS. 8A-8C, the head/neck support member 120 may have a generally curved shape having a middle section 802 and two opposing side sections 804 and 806 curving away from the middle section in the same direction. The middle section 802 may comprise an inner region 808 and an outer region 810 opposite thereto. The side sections 804 and 806 may also include an inner region 812, 814, respectively, and an outer region 816, 818, respectively.

The inner regions 808, 812, and 814 of the middle section and end sections, respectively, are configured to be in contact with at least a portion of the user's lower face and upper chin. In a preferred embodiment, the inner regions 808, 812, and 814 of the head/neck support member 120 may be sized and shaped to match the approximate shape of the lower face and upper neck of the user.

In a preferred embodiment, as shown in FIG. 8B, the inner region 808 of the middle section 802 is shaped to include an indentation or cavity 820 configured to receive and be in contact with at least a portion of the user's chin, and/or an indentation or cavity 822 configured to receive and be in contact with at least a portion of the user's neck. Cavities 820 and 822 are suitably sized and shaped to generally accommodate the lower chin and upper neck of a human head.

In a preferred embodiment, as shown in FIGS. 8A-C, the side sections 804 and 806 may be curved in such a manner to hug or engage at least a portion of the user's lower head and upper neck region. In a preferred embodiment, the head/neck support member 102 may be suitably sized and shaped to accommodate the majority of the human population. In a preferred embodiment, the head/neck support component may be fabricated in a plurality of sizes and dimensions to accommodate different sizes of users, such as adults, children, and the like.

In a preferred embodiment, at least a portion of the head/neck support member 120 may comprise a cushion, foam, pillow, or other pliable material for the comfort of the user as is known in the art. Examples of such materials include, but are not limited to, polyurethane, expanded polyethylene, expanded polypropylene, expanded polystyrene or blends, natural fiber batting such as cotton or synthetic fiber, and combinations thereof. The cushion or foam material may be molded, cut, ground, or otherwise shaped as is known in the art.

In another embodiment, the head/neck support member 120 may comprise a structural shell of a rigid or semi-rigid material, such as a thermoplastic material, such as polyethylene, polypropylene, or polystyrene. The shell material maybe molded, cut, ground, or otherwise shaped as is known in the art. In a preferred embodiment, the structural shell may include a pliable material, such as those discussed above, covering at least a portion of the shell structure for the comfort of the user. In a more preferred embodiment, at least the inner regions 808, 812, and 814 of the shell structure are covered with such pliable material. The pliable material is connected to attached to the shell structure by any suitable device or mechanism known in the art.

In a preferred embodiment, as shown in FIGS. 8A-8C, the head/neck support member 120 may comprise a cover 824 configured to cover and protect the outer regions 810, 818, and 820 of the head neck support member 120. The cover may be made of any suitable material, such as flannels, suede, satin, velvet, mesh, canvas, nylon, transparent plastics, vinyl, and the like. In some embodiments, the cover may be formed from special fabrics additives, such as stain and dirt deterrent, water-tight, flame resistant, fire retardant, recyclable, hydrophilic, antibacterial, antifungal, antiviral, and the like. In a preferred embodiment, the cover 824 may be able to be easily removed from the head/neck support member for cleaning, replacement, and the like. In a preferred embodiment, the cover 824 may comprise a vent or a zipper 826 placed such that it allows for removal of the cover and does not interfere with the comfort of the user, such as on the outer region 810 of the middle section 802.

The head support member 120 may further comprise one or more fastening members, as shown in FIGS. 1 and 5. The fastening members may be connected to the head support member 120 at ends 898 and 899.

In accordance with one embodiment of the present disclosure, the head support component 104 may comprise at least one fastening member for releasably attaching the head/neck support member 120 to the seatback mounting component 102. The head/neck support member 120 may be releasably attached to the seatback mounting component 102 by at least one fastening member extending therebetween. The fastening member may be attached to each opposing side section 804 and 806 of the head/neck support member 120, and extend therefrom and attach to the seatback mounting component 102. In various embodiments, the fastening member may attach to the head cushion member 110, the attachment mechanism 112, or both. The fastening member may be attached to the seatback mounting component 102 and the head/neck support member 120 by use of adhesive, heat seal, bonding means, fastening devices, and the like.

In a preferred embodiment, the fastening member may be a flexible strap, band, belt, strip, line or the like. The fastening member may be made of any suitable material, including, but not limited to, polyester, nylon, plastic, leather, rubber, fabric, and combinations thereof. The fastening members may be sized and shaped in order to securely attach or fasten the head support component 104 and/or the arm support component 106 to the seatback mounting component 102 and to provide sufficient support to the head support component 104 and/or to the arm support component 106, when the device is engaged with a portion of the user's head and neck to provide support to the user's head and neck while sleeping or resting in a vertical or near-vertical position. In a preferred embodiment, the fastening member(s) may be sized so as to provide sufficient support the head support component 104 when engaged with a portion of a user's head and neck, such that the travel comfort device 100 may be used by some, most, and/or a majority of the human population. In a more preferred embodiment, the fastening member may have an adjustable length, similar to an airplane seat belt, such that the fastening member may be adjusted by means known to those skilled in the art, such as by a buckle, to accommodate users of different shapes and sizes.

Figure 9:
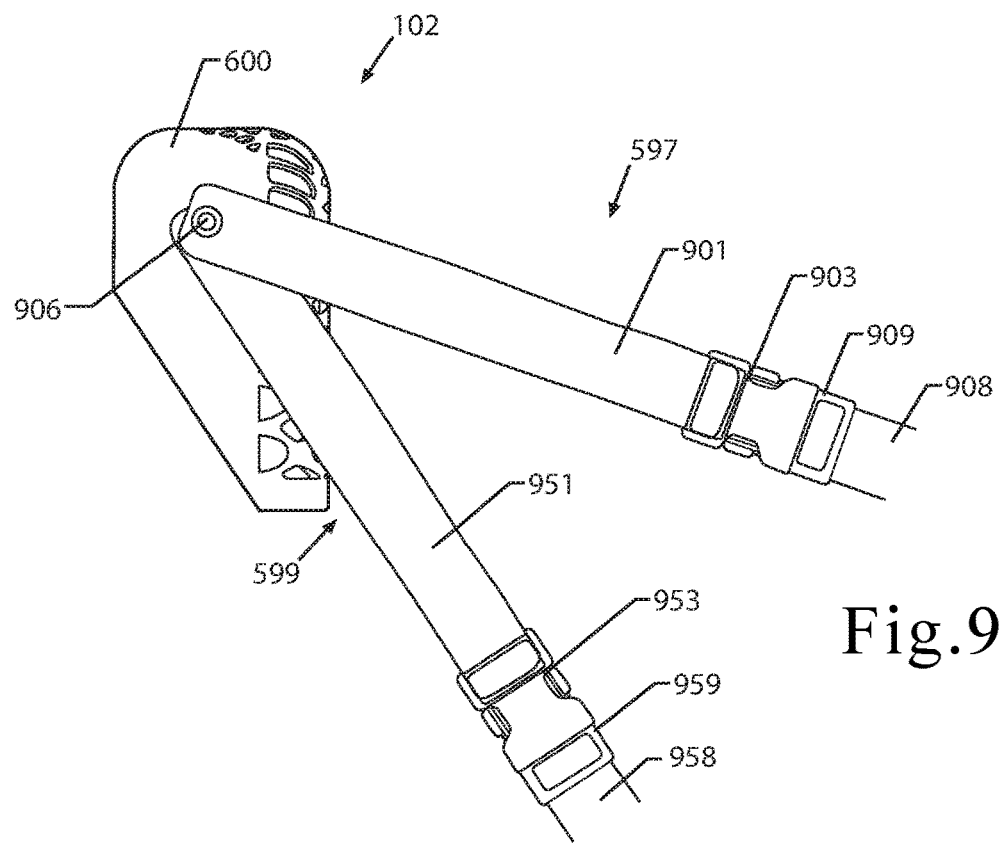
FIG. 9 illustrates a side view of one embodiment of a fastening member for a head support component of a travel comfort device according to the present disclosure.
Figure 10:
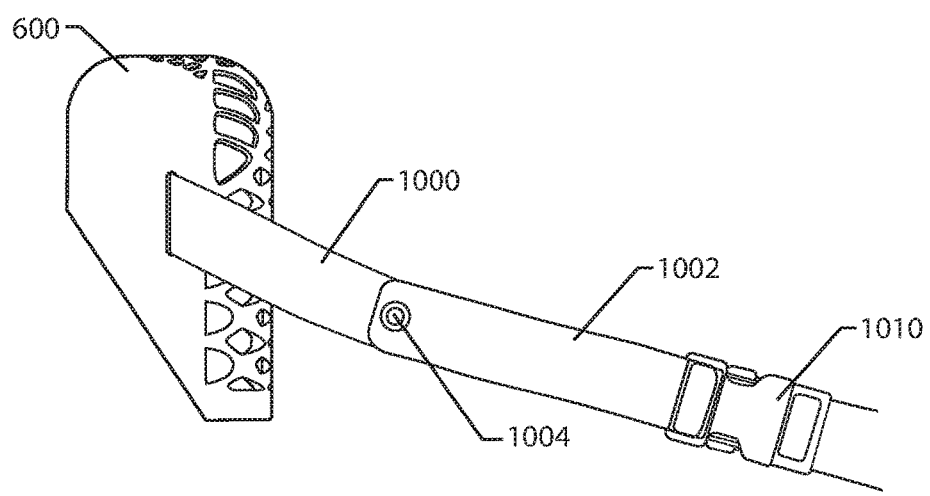
FIG. 10 illustrates a side view of one embodiment of a fastening member for a head support component of a travel comfort device according to the present disclosure.

In some embodiments, as shown in FIGS. 9 and 10, the head/neck support member may be releasably attached to the seatback mounting component 102 by fastening member 597 extending therebetween. In a preferred embodiment, the head fastening member 597 may be attached to the mounting cap 600, and may comprise a cap strap 901, buckle 903, 909, and head strap 908. The user may unbuckle or buckle the buckle 903, 909 to easily release or hold the user's head. The straps 901, 908 may be adjustable to tighten or loosen the users head to the device 100.

In the embodiment shown in FIG. 9, the strap 901 may be connected to a mounting cap 906 of a seatback mounting component via an eyelet stud connection 906 located towards the top of side section 604 thereof, and extends therefrom to the head support component 104. Although not shown, another strap may be suitably connected to the mounting cap 600 via a similar eyelet stud connection located towards the top of the opposite side section 606, and extends therefrom to the other side of the head/neck support member 120.

FIG. 9 shows that the mounting component 102 may further fastening member 599. The arm support member may be releasably attached to the seatback mounting component 102 by fastening member 599 extending therebetween. In a preferred embodiment, the arm fastening member 599 may be attached to the mounting cap 600, and may comprise cap strap 951, buckle 953, 959, and arm support strap 958. The user may unbuckle or buckle the buckle 953, 959 to easily release or hold the user's arms. The straps 951, 958 may be adjustable to tighten or loosen the users arms to the device 100.

In the embodiment shown in FIG. 10, the strap 1000 may be connected to mounting cap 600 and extend therefrom to the head support component 104 or the arm support component 106. In this embodiment, the mounting cap 600 may comprise an elastomeric strap 1000 extending outward from the top of one of the side sections 604. The elastomeric strap 1000 may include an eyelet stud connection 1004 for attachment to the strap 1002 Although not shown, another strap may suitably connected to the mounting cap 600 via a similar eyelet stud connection located on an elastomeric strap extending from the opposite side section 606, and extends therefrom to the head support component 104.

While FIGS. 9 and 10 illustrate the use of an eyelet stud for attachment to the mounting cap 600, any suitable method for attachment may be used. In addition, the location of the eyelet stud or other means for attachment may be varied provided the fastening member provides sufficient support to the head support component 104 and/or the arm component 106. The fastening members may also be attached to other embodiments of the seatback mounting component 102 in a similar fashion. For example, the fastening assembly 300 may have similar fastening components that connect the fastening assembly to the head support component 104 and/or the arm support component 106.

Figure 11:
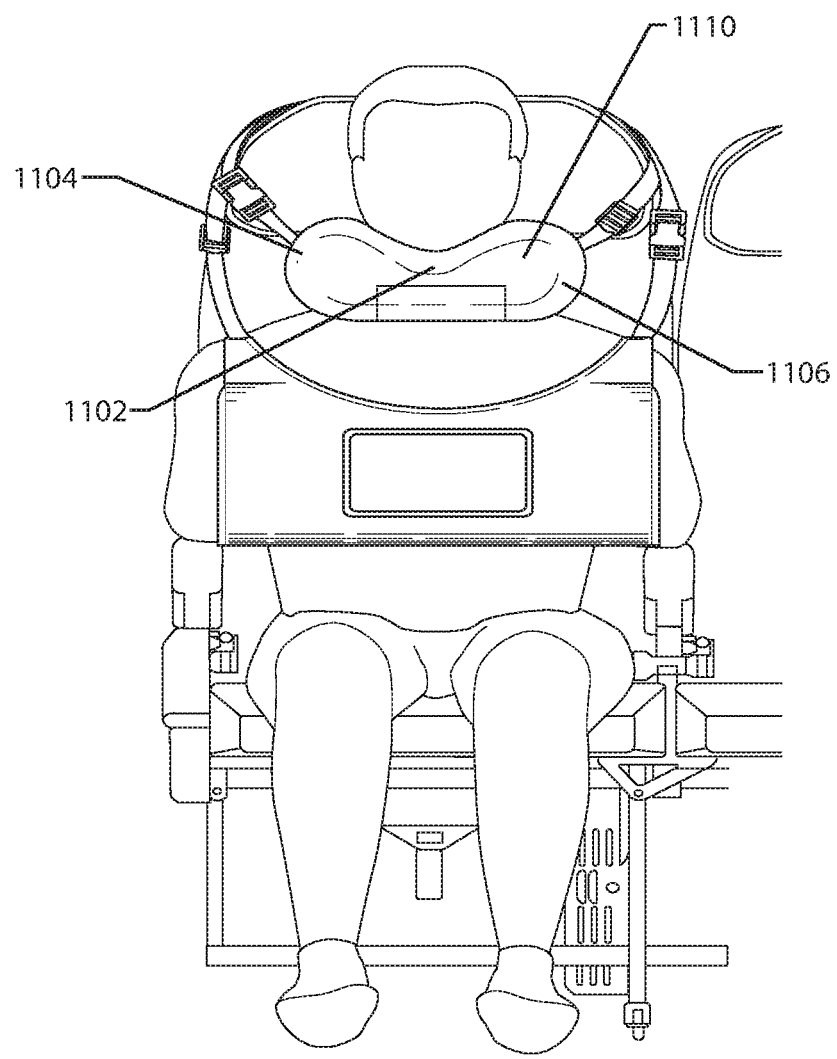
FIG. 11 illustrates a front view of one embodiment of a head/neck support member of a head support component of a travel comfort device according to the present disclosure.

In accordance with another embodiment of the present disclosure, FIG. 11 illustrates another embodiment of the head/neck support member 1100. The head/neck support member 1110 may have a generally curved shape having a middle section 1102 and two opposing side sections 1104 and 1106 curving from the middle section. In this embodiment, the two side sections 1104, 1106 may be configured to only slightly curve upward from the middle section. The head/neck support member 1100 may have the same features as discussed above with respect to the head/neck support member 120 as illustrated in FIGS. 8A-8C.

In accordance with one embodiment of the present disclosure, as shown in FIGS. 1 and 5, the arm support component 106 includes a bib member 130 and at least one fastening member 198, 199, 598, 599 for releasably attaching the arm support component 106 to the seatback mounting component 102.

Figure 12A:
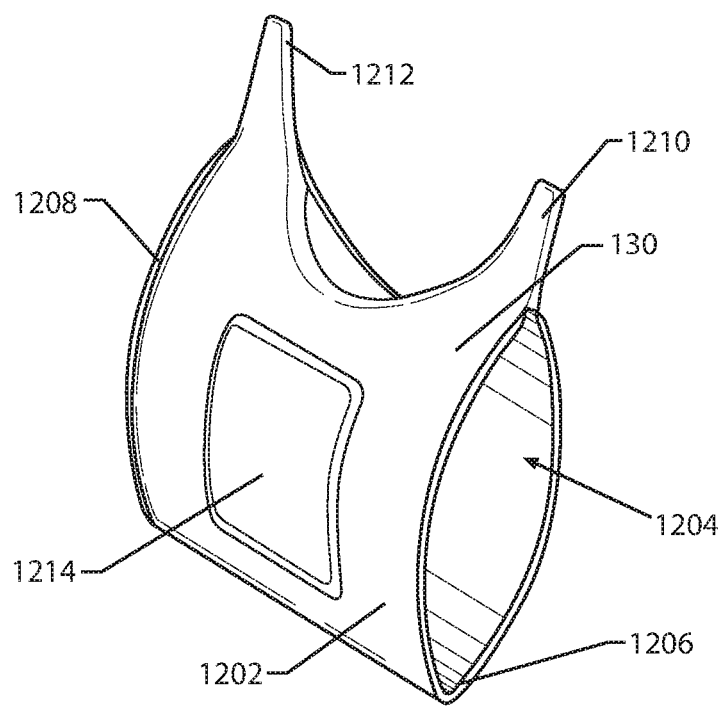
FIG. 12A-B illustrate views of one embodiment of a bib member of an arm support component of a travel comfort device according to the present disclosure.
Figure 12B:
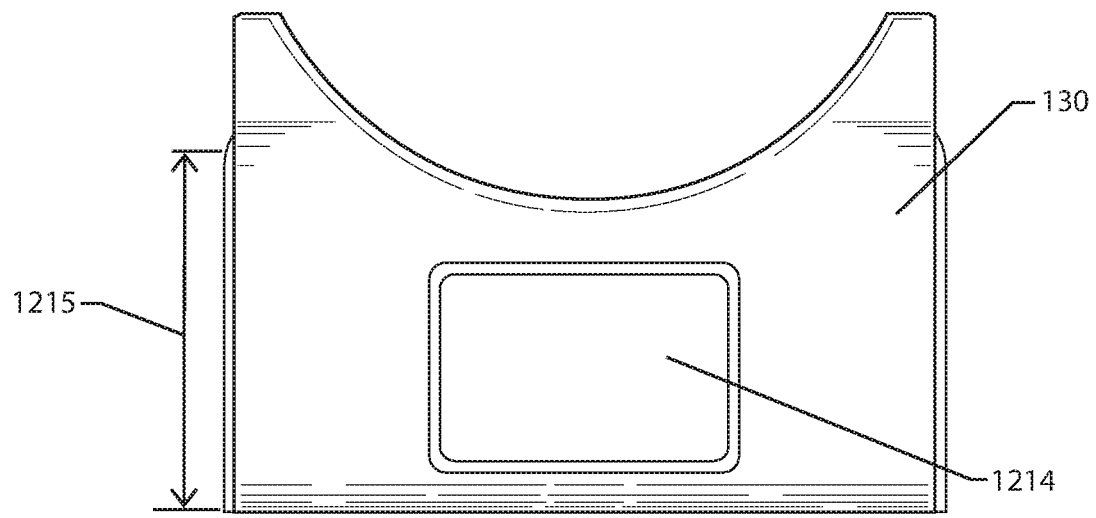

In a preferred embodiment as shown in FIGS. 12A-B, the bib member 130 may be generally rectangular in shape and includes an exterior surface 1202 surrounding and forming an interior pouch portion 1204. The interior pouch portion 1204 may be open at both ends 1206 and 1208 for receiving one or both of the user's arms therein when the travel comfort device is in use. The bib member 130 may also include two attachment members 1210 and 1212 for attaching to one or more fastening members. In a preferred embodiment, the attachment members 1210, 1212 extend upwards from the exterior surface 1202 toward the seatback mounting component 102. In a preferred embodiment, the bib member 130, including the interior pouch portion 1204, is suitably sized and shaped to accommodate the majority of the human population. In a preferred embodiment, the bib member may be fabricated in a plurality of sizes and dimensions to more precisely accommodating different sizes of users, such as adults, children, and the like.

In a preferred embodiment, the exterior surface 1202 may comprise at least one pocket 1214 configured to store objects for the user thereof, such as a cellular telephone, earphones, and the like. The pocket 1214 is preferably located either on a portion of the exterior surface facing towards the user, a portion of the exterior surface facing away from the user, or both.

Figure 13:
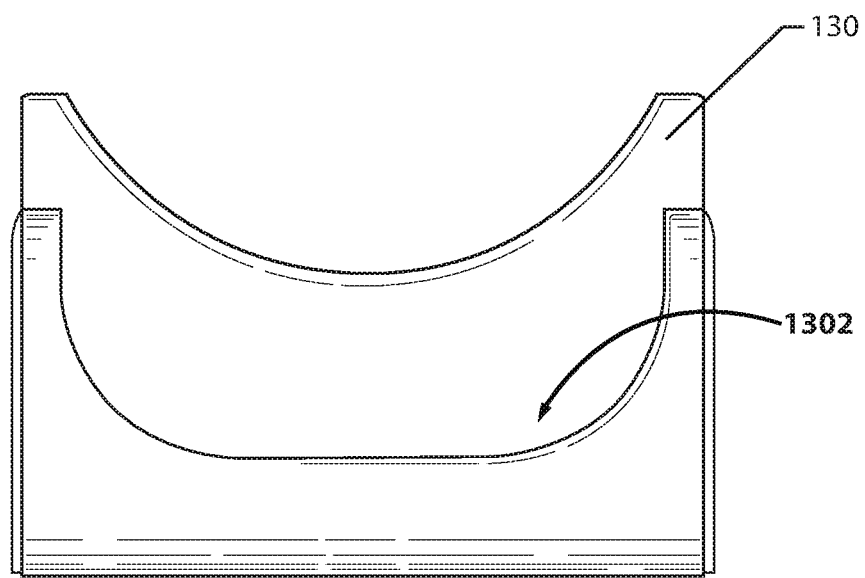
FIG. 13 illustrates a back view of one embodiment of a bib member of an arm support component of a travel comfort device according to the present disclosure.

In another embodiment as shown in FIG. 13, the exterior surface 1202 may comprise an auxiliary arm support pocket 1302 configured to receive one or both arms of the user. The pocket 1302 is preferably located on the exterior surface facing towards the user, facing away from the user, or both. In a preferred embodiment, the auxiliary arm support pocket 1302 may be shaped as a large open pouch for receiving one or both of the user's arms.

The bib member 130 may comprise any suitable material known by those skilled in the art, such as flannels, suede, satin, velvet, mesh, canvas, nylon, transparent plastics, vinyl, and the like. In some embodiments, the bib member 130 may be formed from special fabrics additives, such as stain and dirt deterrent, water-tight, flame resistant, fire retardant, recyclable, hydrophilic, antibacterial, antifungal, antiviral, and the like.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description. The disclosed embodiments capable of modifications in various obvious aspects, all without departing from the spirit and scope of the protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope. It is intended that the scope or protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. A travel comfort device, comprising:
    a seatback mounting component comprising an attachment mechanism configured to releasably attach to a seatback of a seat to be occupied by a user;
    a head support component comprising a head/neck support member and at least one head support component fastening member for attaching said head/neck support member to said seatback mounting component, wherein said head/neck support member is configured to engage with at least a portion of said user's head or neck to provide support to said user's head or neck when said user is seated in said seat; and
    an arm support component comprising a bib member and at least one arm support component fastening member for releasably attaching said bib member to said seatback mounting component.

2. The travel comfort device of claim 1, further comprising an arm support component comprising a bib member and at least one arm support component fastening member for releasably attaching said bib member to said seatback mounting component wherein said head/neck support member is releasably attached to said seatback mounting component.

3. The travel comfort device of claim 1, wherein said bib member comprises an exterior surface surrounding and forming an interior pouch portion, wherein said interior pouch portion is configured to receive at least one of said user's arms.

4. The travel comfort device of claim 3, wherein said seatback mounting component, said head support component, and said arm support component work together so that when said seatback mounting component is releasably attached to said seatback, said head/neck support member is engaged with said at least a portion of said user's head, and said at least one of said user's arms is received into said interior pouch portion of said arm support component, one or more upward, diagonal forces is generated sufficient to support said user's head and said at least one arm of said user while said user is seated and positioned approximately in a vertical position.

5. The travel comfort device of claim 3, wherein said seatback mounting component further comprises a head cushion member;
    wherein said head cushion member is configured to engage with a portion of a back of said user's head when said user is seated.

6. The travel comfort device of claim 5, wherein said seatback mounting component further comprises a fastening assembly attached to said head cushion member and configured to engage with at least a portion of an uppermost portion of said seatback to releasably attach said travel comfort device to said seatback.

7. The travel comfort device of claim 6, wherein said fastening assembly comprises at least one hanger member configured to engage said uppermost portion of said seatback.

8. The travel comfort device of claim 5, wherein said seatback mounting component comprises a mounting cap attached to said head cushion member and configured to engage with at least a portion of an uppermost portion of said seatback to releasably attach said travel comfort device to said seatback.

9. The travel comfort device of claim 8, wherein at least a portion of said mounting cap comprises an elastic material.

10. The travel comfort device of claim 5, wherein an exterior surface of said bib member comprises at least one pocket.

11. The travel comfort device of claim 5, wherein an exterior surface of said bib member comprises an auxiliary arm support pocket configured to receive said at least one arm of said user.

12. The travel comfort device of claim 5, wherein said at least one arm support component fastening member and said at least one head support component fastening member are adjustable.

13. A travel comfort device, comprising:
- a seatback mounting component comprising an attachment mechanism configured to releasably attach to a seatback of a seat to be occupied by a user, and a head cushion member configured to engage with a portion of a back of said user's head when said user is seated; and
- an arm support component comprising a bib member and at least one arm support component fastening member for releasably attaching said bib member to said seatback mounting component;
- wherein said bib member comprises an exterior surface surrounding and forming an interior pouch portion, wherein said interior pouch portion is configured to receive at least one of said user's arms.

14. The travel comfort device of claim 13, further comprising a head support component comprising a head/neck support member and at least one head support component fastening member for releasably attaching said head/neck support member to said seatback mounting component, wherein said head/neck support member is configured to engage with at least a portion of said user's head or neck to provide support to said user's head or neck when said user is seated in said seat; and
- wherein said at least one arm support component fastening member and said at least one head support component fastening member are adjustable.

15. The travel comfort device of claim 14, wherein said seatback mounting component further comprises a fastening assembly attached to said head cushion member and configured to engage with at least a portion of an uppermost portion of said seatback to releasably attach said travel comfort device to said seatback;
- wherein said fastening assembly comprises at least one hanger member configured to engage said uppermost portion of said seatback.

16. The travel comfort device of claim 14, wherein said seatback mounting component comprises a mounting cap attached to said head cushion member and configured to engage with at least a portion of an uppermost portion of said seatback to releasably attach said travel comfort device to said seatback.

17. The travel comfort device of claim 16, wherein at least a portion of said mounting cap comprises an elastic material.

18. The travel comfort device of claim 14, wherein an exterior surface of said bib member comprises at least one pocket.

19. The travel comfort device of claim 14, wherein an exterior surface of said bib member comprises an auxiliary arm support pocket configured to receive said at least one arm of said user.

20. A travel comfort device, comprising:
- a seatback mounting component comprising an attachment mechanism configured to releasably attach to a seatback of a seat to be occupied by a user, and a head cushion member configured to engage with a portion of a back of said user's head when said user is seated;
- an arm support component comprising a bib member and at least one arm support component fastening member for releasably attaching said bib member to said seatback mounting component; and
- a head support component comprising a head/neck support member and at least one head support component fastening member for attaching said head/neck support member to said seatback mounting component, wherein said head/neck support member is configured to engage with at least a portion of said user's head or neck to provide support to said user's head or neck when said user is seated in said seat;
- wherein said bib member comprises an exterior surface surrounding and forming an interior pouch portion, wherein said interior pouch portion is configured to receive at least one of said user's arms; and
- wherein said at least one arm support component fastening member and said at least one head support component fastening member are adjustable.

* * * * *